(No Model.)

C. F. WINKLER.
DYNAMO ELECTRIC MACHINE.

No. 412,352. Patented Oct. 8, 1889.

WITNESSES:
C. N. Benjamin
Wm. A. Rosenbaum

INVENTOR
Charles F. Winkler
BY
W. J. Johnston
ATTORNEY

UNITED STATES PATENT OFFICE.

CHARLES F. WINKLER, OF HOOSICK FALLS, NEW YORK.

DYNAMO-ELECTRIC MACHINE.

SPECIFICATION forming part of Letters Patent No. 412,352, dated October 8, 1889.

Application filed April 23, 1889. Serial No. 308,302. (No model.)

*To all whom it may concern:*

Be it known that I, CHARLES F. WINKLER, a citizen of the United States, residing at Hoosick Falls, in the county of Rensselaer and State of New York, have invented certain new and useful Improvements in Dynamo-Electric Machines and Motors, of which the following is a specification.

My invention relates to dynamo-electric machines and motors; and it consists in improvements in the field-magnets of the same.

The construction will be described with reference to the accompanying drawings, in which—

Figure 1:
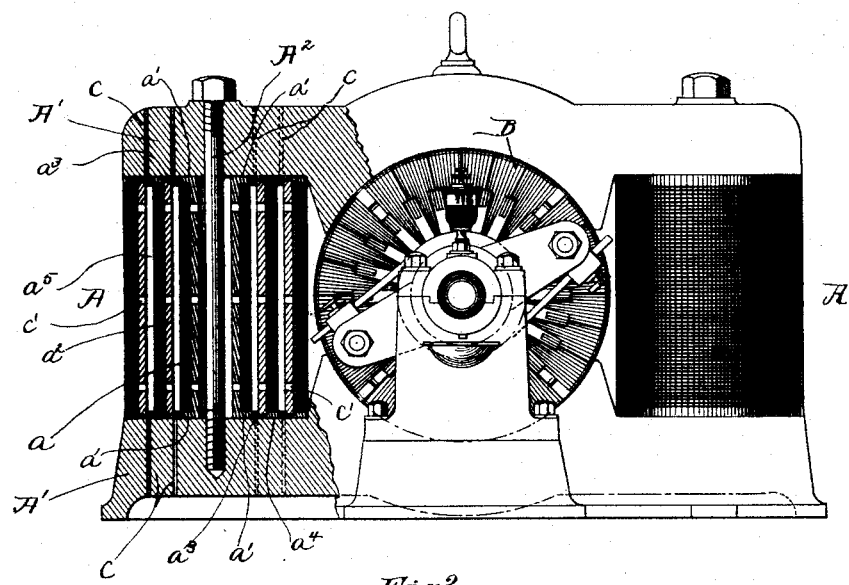
Figure 2:
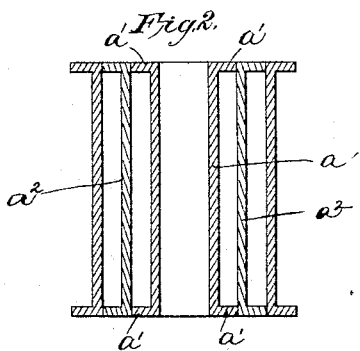

Figure 1 represents an elevation of the machine, one of the field-magnets being shown in section. Fig. 2 is a detail view of one of the magnets without the wire-winding.

Referring to the drawings by letter, A represents the field-magnets of the machine and B the armature. Each field is compound in its construction—that is to say, they are each formed of several coils or layers of wire connected in series or otherwise, and of intermediate sleeves of soft iron.

$a$ represents the core of the magnet. It is formed in the shape of a spool having open ends and laterally-extending flanges $a'$. Upon this spool is wound a layer of wire, of any desired depth, so that it does not quite fill the spool. A soft-iron sleeve $a^2$ is then placed over the spool and secured thereto in any suitable manner, preferably, however, by pins or rivets $a^3$, as shown in Fig. 1, which pass through the ends of the sleeve into the flanges of the center-spool. Metallic rings $a^4$ are then sweated or otherwise secured over the ends of the sleeve $a^2$, thus forming flanges upon the sleeve, which protect and admit of another layer of iron. This layer is applied in the same manner as before, and its depth is such as to allow the flanges to project slightly. Another sleeve and ring may then be added, as before, and, in fact, this construction may be continued as many times as desirable in accordance with the work which it is expected the machine to perform.

It should be understood that I do not confine myself to the manner of forming and securing the sleeves and rings. I may make the sleeves and rings integral, as shown in Fig. 2. The construction would then be a series of spools placed concentrically one around the other.

The structure will now be seen to embody a series of cores and a series of windings, with an air-space $a^5$ between each couple, the couples being all rigidly secured together. The heads or ends of the magnet are smoothed off in order to make good electrical connection with the adjacent faces of the pole-pieces $A'$ $A'$. The magnet is inserted between the said faces and secured in position by a heavy bolt $A^2$, which passes through the pole-pieces and the central chamber in the magnet. The air-chambers are for the purpose of ventilating the magnet to prevent undue heating. A draft is created by perforating the pole-pieces, as shown at $c$ $c$, above and below. These perforations are arranged in circles, so that several may communicate with each space. They may also be used for the purpose of passing the ends of the layers or coils to the outside to connect with a switch for cutting in and out the sections of the magnet to regulate the work of the machine. For additional ventilation I also perforate the sleeves at several different points, as shown at $c$ $c'$. This provides communication between the several air-spaces.

Having described my invention, I claim—

1. In a dynamo or motor, a field-magnet made up of a series of spools arranged concentrically, one outside of the other, each spool being wound with a layer of insulated wire, the spools being rigidly secured together, in combination with pole-pieces secured against the flanges at each end of the magnet, and a bolt extending through the hollow core and securing the parts of the magnet and the pole-pieces together.

2. In a dynamo or motor, a field-magnet made up of a number of concentrically-arranged iron sleeves or spools, each spool carrying a layer of insulated wire, an air-space being left around each spool, and lateral openings or perforations in the sleeves to allow access of the air in said spaces to the adjacent winding of wire.

3. In a dynamo or motor, a field-magnet made up of a series of spools arranged concentrically one outside of the other, each spool being wound with a spool of insulated wire, the spools being all rigidly secured together by means of pins passing radially through the flanges of the spools, in combination with pole-pieces secured against the flanges at each end of the magnet.

In witness whereof I have hereunto signed my name in the presence of two subscribing witnesses.

CHARLES F. WINKLER.

Witnesses:
CHARLES S. BRINTNALL,
WILLIAM L. HALL.